US012671515B2

(12) United States Patent
Wu

(10) Patent No.: US 12,671,515 B2
(45) Date of Patent: Jun. 30, 2026

(54) DEVICE DELAY CALIBRATION METHOD, TERMINAL DEVICE AND STORAGE MEDIUM

(71) Applicant: Lepro Innovation Holding Limited, Hongkong (CN)

(72) Inventor: Ji Wu, Hongkong (CN)

(73) Assignee: Lepro Innovation Holding Limited, Hongkong (CN)

( * ) Notice: Subject to any disclaimer, the term of this patent is extended or adjusted under 35 U.S.C. 154(b) by 272 days.

(21) Appl. No.: 18/711,050

(22) PCT Filed: Apr. 28, 2023

(86) PCT No.: PCT/CN2023/091521
§ 371 (c)(1),
(2) Date: May 16, 2024

(87) PCT Pub. No.: WO2024/221393
PCT Pub. Date: Oct. 31, 2024

(65) Prior Publication Data
US 2025/0385743 A1      Dec. 18, 2025

(51) Int. Cl.
*H04J 3/06* (2006.01)
*H04L 43/0864* (2022.01)

(52) U.S. Cl.
CPC ........ *H04J 3/0667* (2013.01); *H04L 43/0864* (2013.01)

(58) Field of Classification Search
None
See application file for complete search history.

(56) References Cited

U.S. PATENT DOCUMENTS

| 2014/0064175 A1* | 3/2014 | Feather ................. | H04L 65/611 |
| | | | 370/312 |
| 2019/0386926 A1* | 12/2019 | Abedini ............ | H04W 56/0065 |
| 2022/0053487 A1* | 2/2022 | Sengupta .............. | H04W 56/00 |

FOREIGN PATENT DOCUMENTS

CN          104467928          3/2015

* cited by examiner

*Primary Examiner* — Robert M Morlan
(74) *Attorney, Agent, or Firm* — ScienBiziP, P.C.

(57) ABSTRACT

The present application provides a device delay calibration method, a terminal device and a storage medium. The terminal device communicates with a device group, and the method includes: sending a preset instruction to at least one device in the device group, and receiving a feedback signal corresponding to the preset instruction from the at least one device; calculating a round-trip delay of a signal transmission between the terminal device and the at least one device according to the preset instructions and the feedback signal; based on the round-trip delay, calculating a delay determination base corresponding to the at least one device; performing a delay calibration on the at least one device according to the delay determination base. The above method is used to enable the device group to perform a network synchronization when the device group does not have a timer or the timer is inaccurate.

20 Claims, 4 Drawing Sheets

Send a preset instruction to at least one device in the device group, and receive, from the at least one device, a feedback signal of the preset instruction — S11

Calculate a round-trip delay of a signal transmission between a terminal device and the at least one device according to the preset instruction and the feedback signal — S12

Calculate a delay determination base corresponding to the at least one device based on the round-trip delay — S13

Perform a delay calibration on the at least one device according to the delay determination base — S14

DEVICE DELAY CALIBRATION METHOD, TERMINAL DEVICE AND STORAGE MEDIUM

FIELD

The present application relates to a communication field, and in particular, to a device delay calibration method, a terminal device, and a storage medium.

BACKGROUND

A current network synchronization method requires that a device group has a timer. When the device group does not have a timer or the timer is inaccurate due to network problems (such as a network delay, a packet loss, an error packet, etc.) in the device group (for example, the timer cannot be accurately synchronized with a world standard clock), it will be difficult for the device group to achieve a network synchronization.

DESCRIPTION

It should be noted that "at least one" in the present application refers to one or more, and "a plurality of" refers to two or more than two. "And/or" describes an association of associated objects, indicating that there can be three relationships. For example, A and/or B can mean: A exists alone, A and B exist simultaneously, and B exists alone, where A, B can be singular or plural. The terms "first", "second", "third", "fourth", etc. (if present) in the description, claims and drawings of the present application are used to distinguish similar objects, rather than to describe a specific order or a sequence.

In the embodiments of the present application, words such as "exemplary" or "for example" are used to represent examples, illustrations or explanations. Any embodiment or design described as "exemplary" or "for example" in the embodiments of the present application is not to be construed as preferred or advantageous over other embodiments or designs. Rather, use of the words "exemplary" or "for example" is intended to present a concept in a concrete manner. The following embodiments and features in the embodiments may be combined with each other without conflict.

When a general device group performs a network synchronization, a terminal device first sends a signal to the device group and receives a signal, and performs the synchronization calibration on the device group based on the sent signal and the received signal. The device group adjusts a timer according to a received signal so that a control of a time of the device group is synchronized.

However, a related device network synchronization method requires the device group to have a timer. In addition, due to various network problems such as a network delay, a packet loss, and an error packet when the device group sends or receives signals, this will cause the timer of the device group to be inaccurate due to errors, resulting in the inability to accurately synchronize with the world standard clock.

When the device group does not have the timer or the timer is inaccurate due to network problems in the device group (such as the network delay, the packet loss, the error packet, etc.) (for example, the timer cannot accurately synchronize with the world standard clock), the device group cannot be synchronized over the network.

In order to solve the above problem, embodiments of the present application provide a device delay calibration method, a terminal device and a storage medium, which will be introduced below with reference to the relevant drawings.

Figure 1:
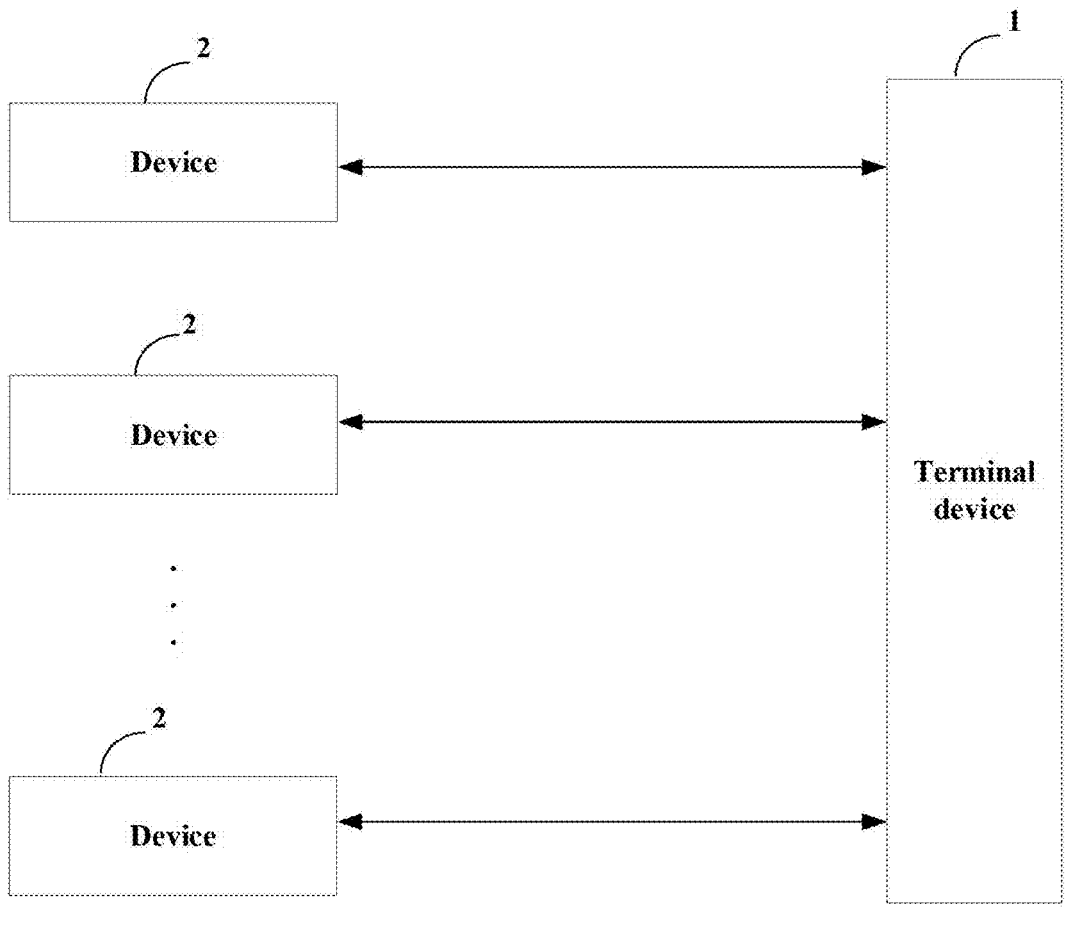
FIG. 1 is an application environment diagram of a device delay calibration method provided by an embodiment of the present application.

As shown in FIG. 1, it is an application environment diagram of the device delay calibration method provided by one embodiment of the present application. In FIG. 1, a terminal device 1 communicates with a plurality of devices 2 respectively, and the plurality of devices 2 constitute a device group. The terminal device 1 can be connected to the plurality of devices 2 in the device group through a BLUETOOTH, a hotspot, a Wi-Fi, etc., so that the terminal device 1 can control the plurality of devices.

The terminal device 1 is a device that can automatically calculate a parameter value and/or process information according to preset or stored instructions. Its hardware includes, but is not limited to, a microprocessor, an application specific integrated circuit (ASIC), a field-programmable gate array (FPGA), a digital signal processor (DSP), an embedded device, etc.

The terminal device 1 may be any electronic product that can interact with a user, such as a personal computer, a tablet computer, a smart phone, or a personal digital assistant (PDA), game consoles, an internet protocol television (IPTV), a smart wearable device (such as a control bracelet), a vehicle-mounted device, etc.

The terminal device 1 may also include a network device and/or a user device. Among them, the network device includes, but is not limited to, a single network server, a server group composed of a plurality of network servers, or a cloud composed of a large number of hosts or network servers based on cloud computing. FIG. 1 is only an example of the terminal device 1 and does not constitute a limitation of the terminal device 1. It may include more or less components than shown in the figure, or combine certain components, or different components. For example, the terminal device 1 may also including an input and output device, a network access device, a bus, etc.

A network in which the terminal device 1 is located includes but is not limited to: Internet, a wide area network, a metropolitan area network, a local area network, a virtual private network (VPN), etc.

The plurality of devices 2 may be a plurality of Internet of Things devices such as monitoring devices, lamps, any home appliances (such as air conditioners and televisions), and speakers.

Figure 2:
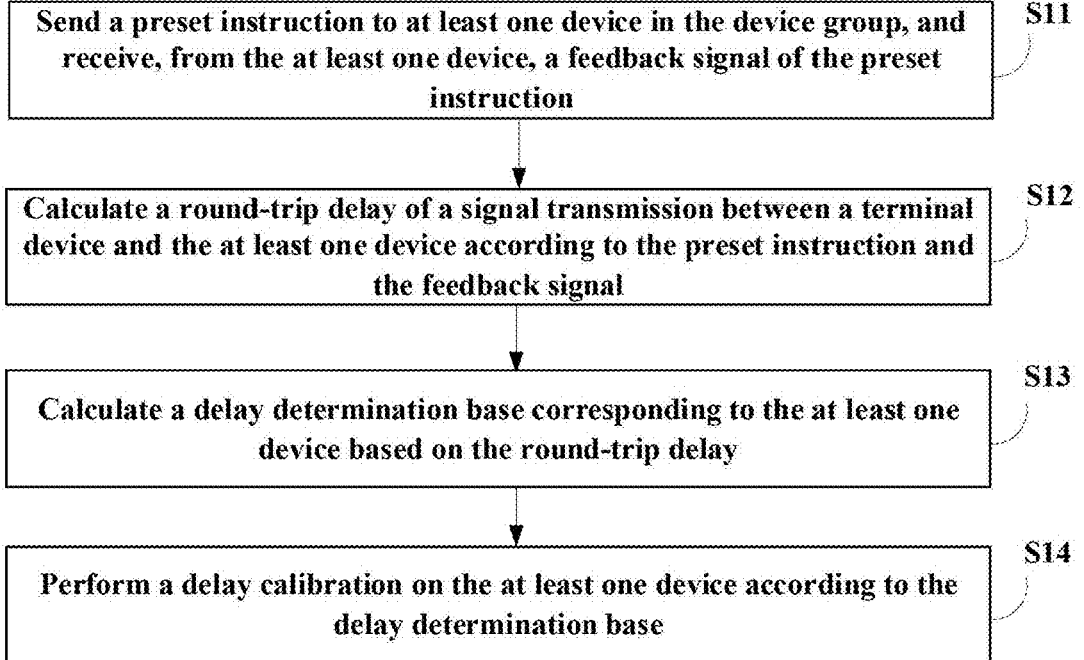
FIG. 2 is a flow chart of a device delay calibration method provided by an embodiment of the present application.

As shown in FIG. 2, it is a flow chart of a device delay calibration method provided by an embodiment of the present application. A subject of executing the method is a terminal device, such as the terminal device 1 shown in FIG.

1. According to different needs, the sequence of each step in this flow chart can be adjusted according to actual requirements, and some steps can be omitted.

S11, sending a preset instruction to at least one device in the device group, and receiving, from the at least one device, a feedback signal corresponding to the preset instruction.

In some embodiments, the device group may be monitoring devices (such as surveillance camera devices, etc.), smart home appliances (such as air conditioners and televisions, etc.), speakers, and lamps (such as smart lamps, light strips, desk lamps, and chandeliers, etc.) and other device.

In some embodiments, the preset instruction is an instruction to cause the at least one device to perform a delay calibration. The preset instruction is set by a user according to a device type of the device group, and the present application does not limit this. For example, if the at least one device is a plurality of lamps, the preset instruction may be an instruction of "music rhythm". When the instruction of "music rhythm" is executed, the plurality of lamps follows the music rhythm and changes a color of a light. When the instruction of "music rhythm" is received, the plurality of lamps may first execute the instruction of "music rhythm" and then perform a delay calibration, or, when the instruction of "music rhythm" is received, the plurality of lamps can first perform the delay calibration and then execute the instruction of "music rhythm"; in addition, the plurality of lamps can also perform the delay calibration and execute the instruction of "music rhythm" at the same time.

In another embodiment, if the at least one device is a plurality of monitoring devices and the preset instruction is a rotation instruction, when the rotation instruction is executed, the plurality of monitoring devices rotates to a preset angle, or rotate according to the preset angle. The plurality of monitoring devices may first execute the rotation instruction and then perform the delay calibration. Alternatively, when the rotation instruction is received, the plurality of monitoring devices may first perform the delay calibration and then execute the rotation instruction. In addition, the delay calibration and the rotation instruction can also be executed at the same time. The preset angle can be set by oneself, and the present application does not limit this. A process of the delay calibration will be introduced in detail below.

In other embodiments of the present application, the preset instruction may also be other instructions for causing the at least one device to perform the delay calibration.

In some embodiments, the feedback signal is a signal sent by the at least one device to the terminal device according to the preset instruction.

The feedback signal can be set by oneself, and the present application does not limit this.

In another embodiment, the feedback signal is a signal sent by the at least one device to the terminal device at a preset node according to the preset instruction. The preset node can be set by oneself, and the present application does not limit this.

For example, when the at least one device is the plurality of lamps and the preset instruction is the instruction of "music rhythm", the preset node may be a time node corresponding to when each device emits a light of a same color when following the music rhythm. The feedback signal may be the time node when each device emits the light of the same color or the same color. For another example, when the at least one device is the plurality of monitoring devices and the preset instruction is the rotation instruction, the preset node may be a time node when the plurality of monitoring devices rotates to the preset angle. The feedback signal may be the preset angle or the time node when the plurality of monitoring devices rotates to the preset angle.

In some other embodiments, when the at least one device is a plurality of other devices such as home appliances, a process related to receive the preset instruction and send the feedback signal by the other devices is similar to the process related to receive the preset instruction and send the feedback signal by the plurality of lamps and the plurality of monitoring devices, so the description will not be repeated in the present application.

In some embodiments, a number of times that the terminal device sends the preset instruction to the at least one device and a number of times that the at least one device sends the feedback signal to the terminal device can be set by itself. The present application does not limit this. The number of times that the terminal device sends the preset instruction to the at least one device and the number of times that the at least one device sends the feedback signal to the terminal device may be the same or different. For example, if the number of the at least one device is 3, the number of times that the terminal device sends the preset instruction to each device may be 3 times, and the number of times that each device received the preset instruction sends the feedback signal to the terminal device for 3 times each time. Alternatively, the number of times that the terminal device sends the preset instruction to each device may be 1 time, and the number of times that each device received the preset instruction sends the feedback signal to the terminal device may be 600 times. Among them, the terminal device may set the number of times that each device required to send the feedback signal in the preset instruction, so that each device received the preset instruction sends the feedback signal for a corresponding number of times.

In some embodiments, the terminal device may communicate with each device in the device group through a wireless communication method or a wired communication method. The terminal device may send the preset instruction to the at least one device in the device group, and receives the feedback signal corresponding to the preset instruction from the at least one device through the wireless communication method or the wired communication method. The wireless communication method include, but is not limited to, a BLUETOOTH, a hotspot, a Wi-Fi and other methods. The wired communication method may be a communication through a bus (such as an I2C bus).

S12, calculating a round-trip delay of a signal transmission between the terminal device and the at least one device according to the preset instruction and the feedback signal.

In some embodiments, when there are a plurality of devices, the round-trip delay includes all round-trip delays of the plurality of devices, each round-trip delay of each device is a sum of a sending delay and a receiving delay, among them, the sending delay is a time duration for the preset instruction to reach each device each time sent by the terminal device, and the receiving delay is a time duration for the feedback signal to reach the terminal device each time sent by each device. Since the number of times that the terminal device sends the preset instruction to each device and the number of times that each device sends the feedback signal to the terminal device can be set by itself, each device can have a plurality of sending delays and a plurality of receiving delays.

For example, assuming there are N number of devices, the number of times that the terminal device sends the preset instruction to each of the N devices is M, for example, the sending delays of the Nth device of the N devices includes $t_{1N}, t_{2N}, t_{3N} \ldots T_{MN}$. If each of the N devices sends the feedback signal to the terminal device for Z times, then the receiving delays of the N the device of the N devices includes $t'_{1N}, t'_{2N}, t'_{3N} \ldots t'_{ZN}$. Assume N=3, Z=20, and M=2, as shown in table 1, there are examples of sending delays, receiving delays, and the round-trip delays corresponding to each device.

|  | 1st device | 2nd device | 3rd device |
|---|---|---|---|
| Sending delays | $t_{11}, t_{21} \ldots t_{201}$ | $t_{12}, t_{22} \ldots t_{202}$ | $t_{13}, t_{23} \ldots t_{203}$ |
| Receiving delays | $t'_{11}, t'_{21} \ldots t'_{201}$ | $t'_{12}, t'_{22} \ldots t'_{202}$ | $t'_{13}, t'_{23} \ldots t'_{203}$ |
| 1st round-trip delay | $t_{11} + t'_{11}$ | $t_{12} + t'_{12}$ | $t_{13} + t'_{13}$ |
| 2nd round-trip delay | $t_{21} + t'_{21}$ | $t_{22} + t'_{22}$ | $t_{23} + t'_{23}$ |
| . . . | . . . | . . . | . . . |
| 20th round-trip delay | $t_{201} + t'_{201}$ | $t_{202} + t'_{202}$ | $t_{203} + t'_{203}$ |

In some embodiments, if any one device of the at least one device does not include a timer, the any one device cannot record a time point when the preset instruction is received and/or a time point when the feedback signal is sent. Therefore, it is necessary to calculate the round-trip delay of the any one device through a timer built-in the terminal device. For each device in the device group or the any one device that does not have the timer, the terminal device can obtain, from the built-in timer, a first time point when the terminal device sends the preset instruction and/or a second time point when the terminal device receives the feedback signal, and calculate the round-trip delay based on the first time point and/or the second time point. For example, the terminal device may directly determine a difference between the second time point and the first time point as the round-trip delay.

In the embodiment of the present application, the number of times that the terminal device sends the preset instruction to each device in the at least one device may be the same as or different from the number of times that each device sends the feedback signal to the terminal device. In addition, since the number of times that the terminal device sends the preset instruction to each device in the at least one device and the number of times that each device sends the feedback signal to the terminal device can be different, therefore, not every sending delay has a corresponding receiving delay, and not every receiving delay has a corresponding sending delay. Therefore, when calculating the round-trip delay, for the receiving delay that does not have a corresponding sending delay or the sending delay that does not have a corresponding receiving delay, the round-trip delay can be determined by a zero padding method. For example, the number of times that the terminal device sends the preset instruction to a device A is 2 times, then the device A has two sending delays t1A and t2A, among them, each preset instruction requires the device A to send the feedback signal to the terminal device for 2 times, then the number of times that the device A sends the feedback signal to the terminal device is 4 times, and the device A has 4 receiving delays t'1A, t'2A, t'3A, and t'4A, so the round-trip delays of the device A is 4, a first round-trip delay is t1A+ t'1A, a second round-trip delay is 0+t'2A, a third round-trip delay is t2A+t'3A, and a fourth round-trip delay is 0+t4A.

In this embodiment, even when there is a device not having a timer in the device group, the round-trip delay corresponding to the device not having the timer can be calculated based on the time point at which the preset instruction is sent and the time point at which the feedback signal is received which can be obtained from the timer of the terminal device, thus solving the technical problem of being unable to perform the network synchronization due to the device in the device group not having the timer.

In another embodiment, for any device having the timer, according to the timer of the device having the timer, the time point at which the preset instruction sent by the terminal device is received can be recorded and the time point at which the feedback signal sent to the terminal device can be recorded, the terminal device obtains the above two time points from the device with the timer and calculates the corresponding round-trip delay.

S13, calculating a delay determination base corresponding to the at least one device based on the round-trip delay.

In some embodiments, the delay determination base is determined based on a time value determined by a probabilistic statistical method according to all round-trip delays corresponding to each device in the device group. For example, the time value may be a mean value, a median, or a weighted average. For example, the terminal device calculates the time value based on all round-trip delays corresponding to each device in the device group, and then calculates the delay determination base corresponding to each device according to the time value and the round-trip delays corresponding to each device.

Among them, the terminal device may input the time value and the round-trip delays corresponding to each device into a preset probability statistic to calculate the delay determination base. The probability statistic includes, but is not limited to, a mean analysis, a T test, a Z test, a variance analysis, a LOGISTIC regression model, a decision tree and other models. Since different probability statistics have different calculation formulas, the delay determination bases calculated through different probability statistics are also different.

For example, when the time value is the mean value, the calculation method of the time value can refer to formula (1):

$$\bar{t}_j = \frac{\sum_{i=1}^{M} \sum_{k=1}^{Z} \left( t_{ij} + t'_{kj} \right)}{\max(M, Z)}, \, j = 1, 2, 3 \ldots N; \tag{1}$$

Among them, $\bar{t}_j$ represents the time value of the jth device of the at least one device, M represents the number of times the terminal device sends the preset instruction to the jth device, Z represents the number of times the jth device sends the feedback signal to the terminal device, $t_{ij}$ represents the sending delay of the ith time the terminal device sends the preset instruction to the jth device, $t'_{kj}$ represents the receiving delay of the kth time the jth device sends the feedback signal to the terminal device, max (M,Z) represents a larger value between M and N, and N represents the number of devices of the at least one device.

In some embodiments, if the probability statistic is the mean analysis and the number of devices in the at least one device is N, the calculation method of the delay determination base can refer to formula (2):

$$T_N = \frac{\sum_{j=1}^{N} \bar{t}_j}{N}; \tag{2}$$

Among them, $T_N$ represents the delay determination base of the N number of devices, N represents the number of devices of the at least one device, and $\bar{t}_j$ represents the time value of the jth device.

S14, performing a delay calibration on the at least one device according to the delay determination base.

In some embodiments, the terminal device performing the delay calibration on the at least one device according to the delay determination base may include: the terminal device determining whether the at least one device needs to be calibrated based on the round-trip delay, the delay determination base and a preset calibration threshold of the probability statistic, and performing the delay calibration on the at least one device when it is determined that the at least one device need to be calibrated.

Among them, the calibration threshold of the probability statistic can be set by oneself, or the calibration threshold of the probability statistic can also be set by oneself according to a calculation result below, which is not limited in the present application.

In some embodiments, the terminal device determining whether the at least one device needs to be calibrated based on the round-trip delay, the delay determination base and the preset calibration threshold of the probability statistic includes: the terminal device obtains a calculation result corresponding to each device according to the round-trip delay corresponding to each device and the delay determination base, and then the terminal device determines whether the device corresponding to the calculation result needs to be calibrated based on a comparison result of the calculation result and the calibration threshold of the probability statistic, and determining the device that needs to be calibrated as the device to be calibrated.

In some embodiments, the terminal device may use a variance between all round-trip delays corresponding to each device and the delay determination base as the calculation result of each device. For example, following the above embodiment, if the number of devices in the at least one device is N, the terminal device performs the calculation based on all round-trip delays corresponding to each device and the delay determination base, and obtains the calculation result of each device referring a formula (3):

$$S_j = \frac{\sum_{i=1}^{M}\sum_{k=1}^{Z}\left(t_{ij} + t'_{kj} - T_N\right)^2}{\max(M, Z)}, j = 1, 2, 3 \dots N; \qquad (3)$$

Among them, $S_j$ represents the calculation result of the jth device, M represents the number of times the terminal device sends the preset instruction to the jth device, Z represents the number of times the jth device sends the feedback signal to the terminal device, $t_{ij}$ represents the sending delay of the ith time the terminal device sends the preset instruction to the jth device, $t'_{kj}$ represents the receiving delay of the kth time the jth device sends the feedback signal to the terminal device, $T_N$ represents the delay determination base of the N devices, max (M,Z) represents a larger value between M and N.

In some embodiments, when the terminal device determines the variance between all round-trip delays corresponding to each device and the delay determination base as the calculation result of each device, the terminal device can refer to a formula (4) to compare the calculation result of each device with the calibration threshold of the probability statistic:

$$S_j = \frac{\sum_{i=1}^{M}\sum_{k=1}^{Z}\left(t_{ij} + t'_{kj} - T_N\right)^2}{\max(M, Z)} \geq a, \text{ or,} \qquad (4)$$

$$S_j = \frac{\sum_{i=1}^{M}\sum_{k=1}^{Z}\left(t_{ij} + t'_{kj} - T_N\right)^2}{\max(M, Z)} < a;$$

Among them, a represents the calibration threshold of the probability statistic.

In this embodiment, if the calculation result of the jth device $S_j$ is greater than or equal to the calibration threshold of the probability statistic a, the terminal device determines that the jth device needs to be calibrated, and determines the jth device as the device to be calibrated, and calibrates the jth device. Alternatively, if the calculation result of the jth device $S_j$ is less than the calibration threshold of the probability statistic a, the terminal device determines that the jth device does not need to be calibrated.

In this embodiment, the variance between all round-trip delays corresponding to each device of the at least one device and the delay determination base is used as the calculation result of each device, because in a process of calculating the calculation result of each device, data is squared, so a value of the calculation result can be enlarged, making each comparison result more accurate when comparing the calculation result of each device with the calibration threshold of the probability statistic.

In some other embodiments, since the time value of each device in the at least one device is calculated based on the round-trip delays corresponding to each device, so the terminal device can also use the difference between the time value of each device and the delay determination base as the calculation result of each device. For example, following the above embodiment, if the number of devices in the at least one device is N, a method that the terminal device calculates based on the time value of each device in the at least one device and the delay determination base to obtain a corresponding calculation result of each device can refer to a formula (5):

$$S_j = \bar{t}_j - T_N; \qquad (5)$$

Among them, $S_j$ represents the calculation result of the jth device, $\bar{t}_j$ represents the time value of the jth device, and $T_N$ represents the delay determination base of the N devices.

Figure 4:
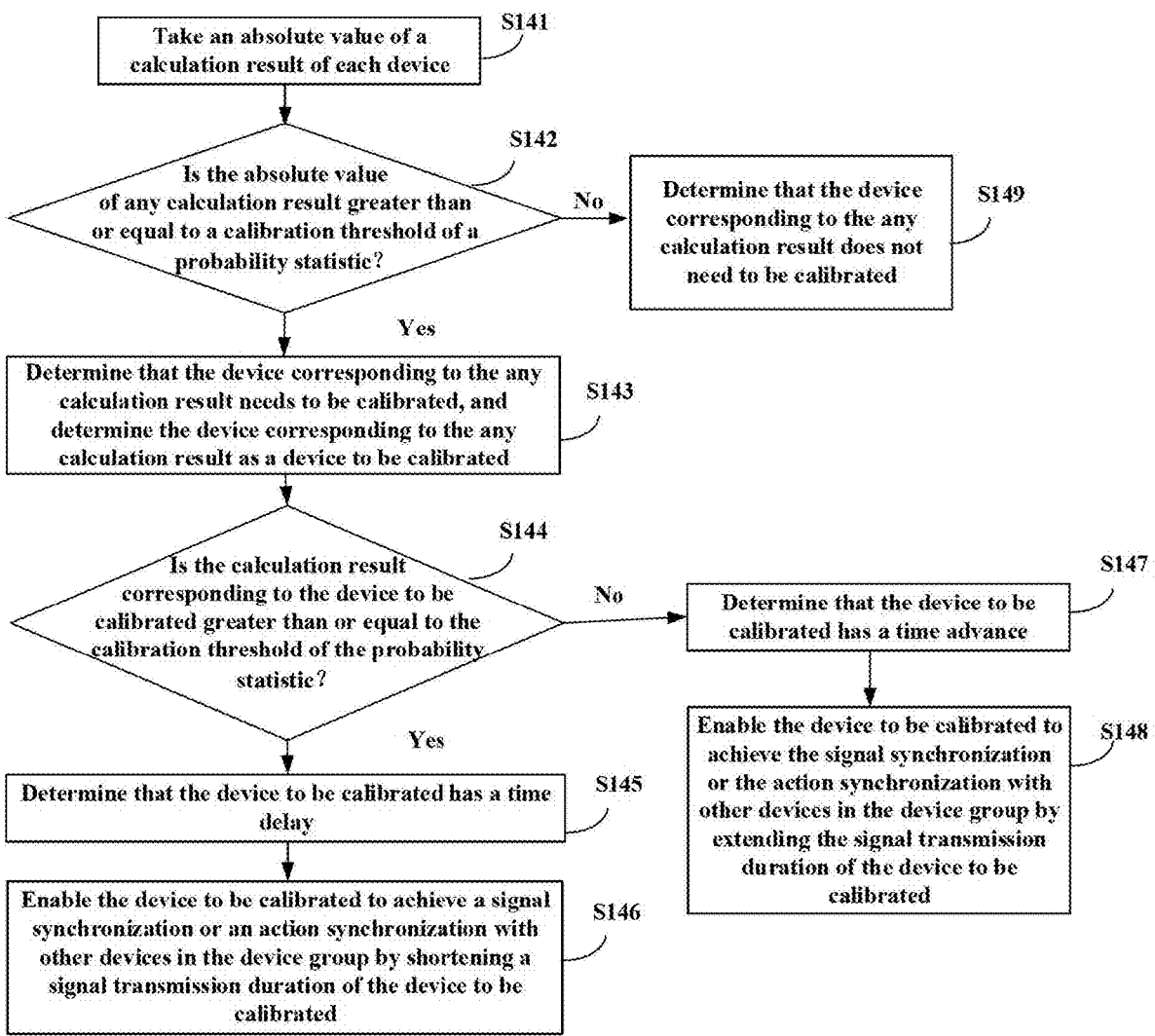
FIG. 4 is a flow chart of a device delay calibration method provided by another embodiment of the present application.

In some embodiments, when using the difference between the time value of each device and the delay determination base as the calculation result of each device, processes of determining whether the device corresponding to the calculation result needs to be calibrated based on the comparison result between the calculation result and the calibration threshold of the probability statistic, and calibrating the device to be calibrated, can be referred to a description of processes shown in FIG. 4 below.

In other embodiments of the present application, the terminal device may also adopt other probabilistic statistical methods, such as a mean squared error (MSE), a mean absolute error (MAE), and a probabilistic hypothesis testing, etc., to calculate the calculation result of each device, and the present application does not limit a generation method of each calculation result.

Through the above implementation, the round-trip delay is the sum of the sending delay of the preset instruction to the at least one device and the receiving delay of the feedback signal to the terminal device. Since the terminal device includes the timer, therefore, even when the device in the device group does not have a timer, the time point at which the preset instruction is sent and the time point at which the feedback signal is received can be obtained from the timer in the terminal device, and the round-trip delay can be calculated, thereby solving the technical problem of being unable to perform the network synchronization due to the device in the device group not having the timer. In addition, when the at least one devices includes a plurality of devices and there is a plurality of round-trip delays corresponding to each device, since the delay determination base is calculated based on all the round-trip delays of the plurality of devices, the delay determination base can represent a situation of the round-trip delays of the plurality of devices, calculate the calculation result between each round-trip delay of each device and the corresponding delay determination base, and compare each calculation result with the calibration threshold of the probability statistic, can accurately determine whether the device corresponding to the calculation result needs calibration. Calibrating the devices that need to be calibrated in the device group can synchronize the time of signals/actions of all devices in the device group without the need for the timer to accurately synchronize with the world standard clock, thereby solving the technical problem of the device group being unable to synchronize over the network because of the timer is not accurate.

Figure 3:
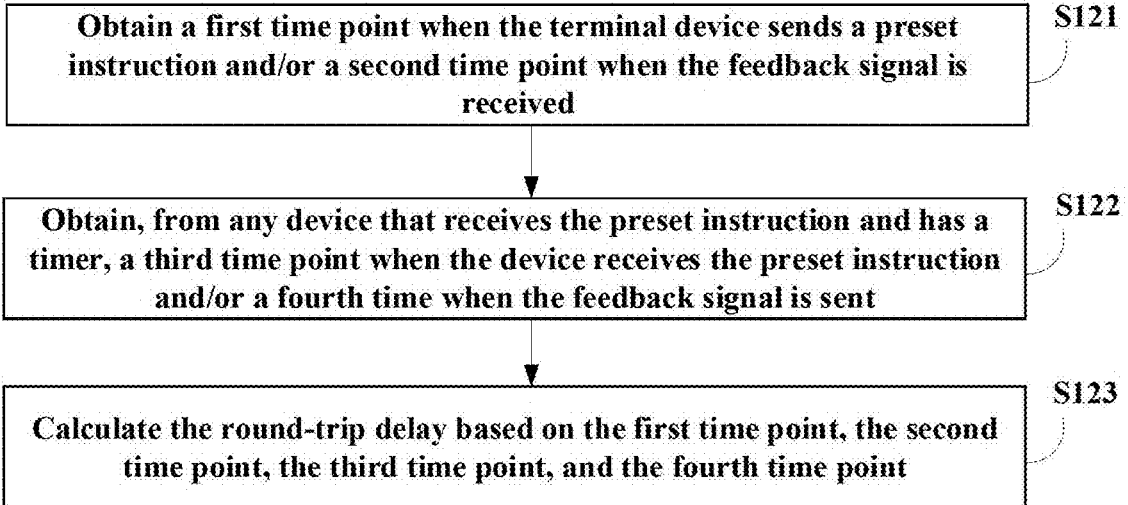
FIG. 3 is a flow chart of a round-trip delay calculation method provided by an embodiment of the present application.

In some embodiments, FIG. 3 is a flow chart of a method for calculating a round-trip delay provided by an embodiment of the present application. Specifically, it includes the following steps:

S121, the terminal device obtains a first time point when the terminal device sends a preset instruction and/or a second time point when the feedback signal is received.

In this embodiment, since the number of times the terminal device sends the preset instruction may include a plurality of times, and the number of times the at least one device sends the feedback signal may include a plurality of times, then there can be a plurality of first time points and a plurality of second time points, and the terminal device can obtain the plurality of first time points and the plurality of second time points from a built-in timer.

S122, the terminal device obtains, from any device that receives the preset instruction and has a timer, a third time point when the device receives the preset instruction and/or a fourth time point when the feedback signal is sent.

In this embodiment, since the number of times the terminal device sends the preset instruction and the number of times the device sends the feedback signal can be multiple times, then there can be a plurality of third time points and a plurality of fourth time points. In addition, since the terminal device is communicatively connected to each device, the terminal device can send a preset instruction for acquiring a time to the device. The preset instruction for acquiring the time requires the device to obtain, from a built-in timer, the third time point of the device receiving the preset instruction and/or the fourth time point of sending the feedback signal, and send the third time point and the fourth time point to the terminal device, so that the terminal device obtains the third time point and the fourth time point. The preset instruction for acquiring the time can be set by oneself, and the present application does not limit this.

S123, the terminal device calculates the round-trip delay based on the first time point, the second time point, the third time point, and the fourth time point.

In some embodiments, the terminal device calculates a first difference between the third time point and the first time point, and calculates a second difference between the second time point and the fourth time point, and then the terminal device determines a sum of the first difference and the second difference as the round-trip delay.

In this embodiment, since the third time point and the fourth time point are accurate time points and do not include a time duration for any device to respond and execute the preset instruction, so the round-trip delay calculated based on the first time point, the second time point, the third time point, and the fourth time point is more accurate.

In some embodiments, if the terminal device determines the difference between the time value of each device and the delay determination base as the calculation result of each device, FIG. 4 is a flowchart of a device delay calibration method provided by another embodiment of the present application. Specifically, it includes the following steps:

S141, the terminal device takes an absolute value of the calculation result of each device.

In this embodiment, the absolute value of the calculation result is only an example and not a limitation. The absolute value can quickly filter out the device that needs calibration.

In other embodiments, the terminal device may not take the absolute value of each calculation result.

S142, the terminal device compares the absolute value of each calculation result with the calibration threshold of the probability statistic, and determines whether the absolute value of each calculation result is greater than or equal to the calibration threshold of the probability statistic.

For example, following the above embodiment, if the number of devices in the at least one device is N, the terminal device may refer to a formula (6) to compare each calculation result with the calibration threshold of the probability statistic:

$$S_j = |\bar{T}_j - T_N| \geq b, \text{ or,} \qquad (6)$$
$$S_j = |\bar{T}_j - T_N| < b;$$

Among them, b represents the calibration threshold of the probability statistic.

In this embodiment, the difference between the time value of each device and the delay determination base is directly determined as the calculation result of each device, and the absolute value of the calculation result of each device is compared with the calibration threshold of the probability statistic which can quickly obtain a comparison result.

S143, if the absolute value of any calculation result is greater than or equal to the calibration threshold of the probability statistic, the terminal device determines that the device corresponding to the any calculation result needs to be calibrated, and determines the device corresponding to the any calculation result as a device to be calibrated.

In some embodiments, when the absolute value of the any calculation result is greater than or equal to the calibration threshold of the probability statistic, it means that the round-trip delay of the device corresponding to the any calculation result is abnormal, and it is necessary to calibrate the device corresponding to the any calculation result.

S144, the terminal device compares the calculation result corresponding to the device to be calibrated with the calibration threshold of the probability statistic, and determines whether the calculation result corresponding to the device to be calibrated is greater than or equal to the calibration threshold of the probability statistic.

In some embodiments, when the absolute value of the calculation result corresponding to the device to be calibrated is greater than or equal to the calibration threshold of the probability statistic, a relationship between the calculation result corresponding to the device to be calibrated and the calibration threshold of the probability statistic includes that the calculation result corresponding to the device to be calibrated is greater than or equal to the calibration threshold of the probability statistic, or, the calculation result corresponding to the device to be calibrated is less than the calibration threshold of the probability statistic.

S145, if the calculation result corresponding to the device to be calibrated is greater than or equal to the calibration threshold of the probability statistic, the terminal device determines that the device to be calibrated has a time delay.

In an embodiment of the present application, comparing the calculation result corresponding to the device to be calibrated with the calibration threshold of the probability statistic is to determine a method for calibrating the device to be calibrated. If the calculation result corresponding to the device to be calibrated is greater than or equal to the calibration threshold of the probability statistic, it means that a signal transmission duration of the device to be calibrated is greater than a signal transmission duration of other device in the at least one device, and it is necessary to reduce an information segment in the signal to reduce the signal transmission duration of the device to be calibrated.

In another embodiment of the present application, if there are a plurality of devices to be calibrated corresponding to calculation results that are greater than the calibration threshold of the probability statistic, then it represents that the signal transmission duration of each of the plurality of devices to be calibrated is greater than that of each of other devices in the at least one device.

In this embodiment, when there are a plurality of round-trip delays corresponding to the device to be calibrated, since the delay determination base of the device to be calibrated can represent a degree of a fluctuation between the plurality of round-trip delays corresponding to the device to be calibrated, therefore, by comparing the calculation result corresponding to the device to be calibrated with the calibration threshold of the probability statistic, it can be accurately determined whether a time delay occurs in the device to be calibrated.

S146, when the device to be calibrated has the time delay, the terminal device enables the device to be calibrated to achieve a signal synchronization or an action synchronization with other devices in the device group by shortening the signal transmission duration of the device to be calibrated.

In this embodiment, the terminal device can control the device to be calibrated to reduce the information segment in the signal to be sent to shorten the signal transmission duration of the device to be calibrated, so that the device to be calibrated achieves the signal synchronization or the action synchronization with other devices in the device group.

In some embodiments, the terminal device may send a calibration instruction to the device to be calibrated so that the device to be calibrated reduces the information segment in the signal to be sent. The calibration instruction can be set by oneself and are not limited in the present application.

In some other embodiments, the terminal device may adopt other methods to control the device to be calibrated to shorten the signal transmission duration of the device to be calibrated. The above description in the present application is only an example and not a limitation.

S147, if the calculation result corresponding to the device to be calibrated is less than the calibration threshold of the probability statistic, the terminal device determines that the device to be calibrated has a time advance.

In an embodiment of the present application, if the calculation result corresponding to the device to be calibrated is less than the calibration threshold of the probability statistic, it means that the signal transmission duration of the device to be calibrated is less than the signal transmission duration of each of other devices in the at least one device, it is necessary to delay a time duration of sending a signal or to increase the information segment in the signal to increase the signal transmission duration of the device to be calibrated.

In another embodiment of the present application, if there are a plurality of devices to be calibrated corresponding to calculation results that are less than the calibration threshold of the probability statistic, then the signal transmission duration of each of the plurality of devices to be calibrated is shorter than that of each of other devices in the at least one device.

S148, when the device to be calibrated has the time advance, the terminal device enables the device to be calibrated to achieve the signal synchronization or the action synchronization with other devices in the device group by extending the signal transmission duration of the device to be calibrated.

In this embodiment, the terminal device may control the device to be calibrated to increase the information segment in the signal to be sent to extend the signal transmission duration of the device to be calibrated, so that the device to be calibrated achieves the signal synchronization or the action synchronization with other devices in the device group. The method of the terminal device controls the device to be calibrated to increase the information segment in the signal to be sent is basically the same as the method of the terminal device controls the device to be calibrated to reduce the information segment in the signal to be sent, so it will not be repeated. describe.

S149, if the absolute value of any calculation result is less than the calibration threshold of the probability statistic, the terminal device determines that the device corresponding to the any calculation result does not need to be calibrated.

In some embodiments, when the absolute value of any calculation result is less than the calibration threshold of the probability statistic, it means that the round-trip delay of the device corresponding to any calculation result is normal.

Figure 5:
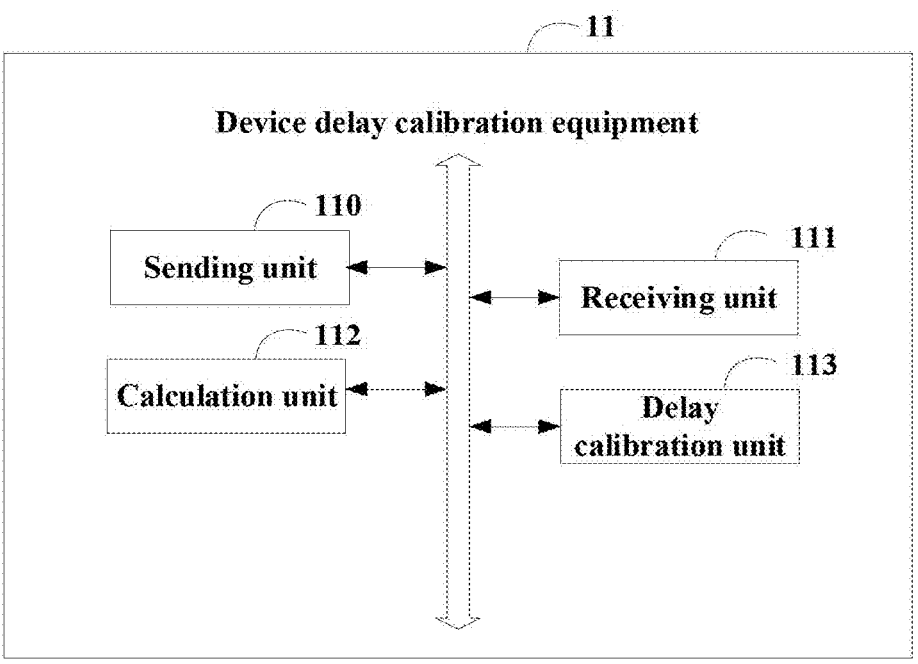
FIG. 5 is a functional module diagram of a device delay calibration equipment provided by an embodiment of the present application.

As shown in FIG. 5, it is a functional module diagram of a device delay calibration equipment provided by an embodiment of the present application. The device delay calibration equipment 11 includes a sending unit 110, a receiving unit 111, a calculation unit 112 and a delay calibration unit 113. The module/unit referred to in the present application refers to a series of computer-readable instruction segments that can be acquired by the processor 13 in FIG. 6 and can complete a fixed function, which are stored in the storage device 12 in FIG. 6. In this embodiment, the functions of each module/unit will be described in detail in subsequent embodiments.

In some embodiments, the sending unit 110 is configured to send a preset instruction to at least one device in the device group.

In some embodiments, the receiving unit 111 is configured to receive a feedback signal corresponding to the preset instruction from the at least one device.

In some embodiments, the calculation unit 112 is configured to calculate a round-trip delay of a signal transmission between the terminal device and the at least one device according to the preset instruction and the feedback signal.

In an embodiment of the present application, the calculation unit 112 is also configured to obtain a first time point when the terminal device sends the preset instruction and/or a second time point when the feedback signal is received, and calculate the round-trip delay according to the first time point and/or the second time point.

In some embodiments, the calculation unit 112 is also configured to calculate a delay determination base corresponding to the at least one device based on the round-trip delay.

In an embodiment of the present application, the delay determination base is determined based on a time value determined by a probabilistic statistical method according to all round-trip delays corresponding to each device in the device group.

In an embodiment of the present application, the calculation unit 112 is also configured to calculate the time value based on all round-trip delays corresponding to each device in the device group, and calculate the delay determination base according to the time value and the round-trip delays of each device.

In an embodiment of the present application, the calculation unit 112 is also used to calculate the delay determination base based on a probability statistic.

In some embodiments, the delay calibration unit 113 is configured to perform a delay calibration on the at least one device according to the delay determination base.

In an embodiment of the present application, the delay calibration unit 113 is also used to determine whether the at least one device needs to be calibrated based on the round-trip delays, the delay determination base and a preset calibration threshold of the probability statistic.

In an embodiment of the present application, the delay calibration unit 113 is also configured to calculate based on the round-trip delays corresponding to each device and the delay determination base if there are a plurality of devices, and obtain a calculation result corresponding to each device, and determine whether the device corresponding to the calculation result needs to be calibrated based on a comparing result between the calculation result and the calibration threshold of the probability statistic.

In an embodiment of the present application, the delay calibration unit 113 is also configured to, if it is determined that any device of the at least one devices has a time delay according to the delay determination base, by shortening a signal transmission duration of the any device, to enable the any device to achieve a signal synchronization or an action synchronization with other devices in the device group, or if it is determined that any device of the at least one devices has a time advance according to the delay determination base, by extending the signal transmission duration of the any device, to enable the any device to achieve the signal synchronization or the action synchronization with other devices in the device group.

In an embodiment of the present application, after performing the delay calibration on the at least one device, the delay calibration unit 113 is also configured to send the preset instruction to the device that has completed the calibration, and verify that whether the calibrated device is correctly calibrated according to the preset instruction.

Through the above implementation, the round-trip delay is the sum of the sending delay of the preset instruction to the at least one device and the receiving delay of the feedback signal to the terminal device. Since the terminal device includes the timer, therefore, even when the device in the device group does not have a timer, the time point at which the preset instruction is sent and the time point at which the feedback signal is received can be obtained from the timer in the terminal device, and the round-trip delay is calculated, thereby solving the technical problem of being unable to perform the network synchronization due to the device in the device group not having the timer. In addition, when there are a plurality of devices in the at least one devices and there are a plurality of round-trip delays corresponding to each device, since the delay determination base is calculated from all the round-trip delays of the plurality of devices, the delay determination base can characterize a situation of the round-trip delays of the plurality of devices, by calculating the calculation result between each round-trip delay of each device and the corresponding delay determination base, and comparing each calculation result with the calibration threshold of the probability statistic, whether the device corresponding to the calculation result needs calibration can be accurately determined. Calibrating the devices that need to be calibrated in the device group can synchronize the time of signals/actions of all devices in the device group without the need for timers to accurately synchronize with the world standard clock, thereby solves the technical problem of the device group being unable to synchronize over the network due to inaccurate timers.

Figure 6:
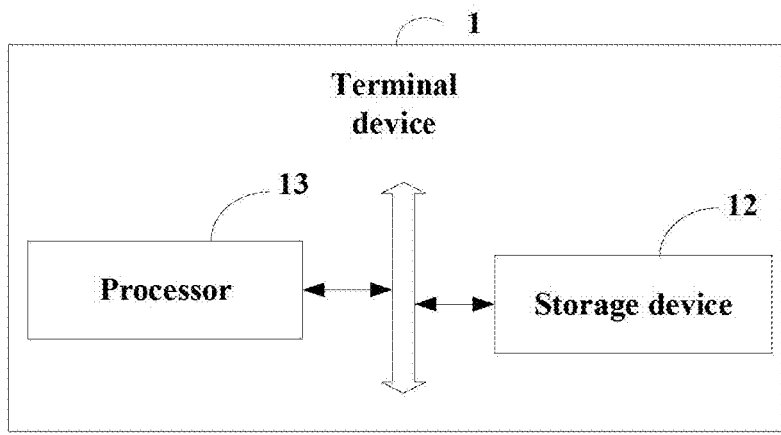
FIG. 6 is a structural diagram of a terminal device provided by an embodiment of the present application.

As shown in FIG. 6, it is a structural diagram of a terminal device provided by an embodiment of the present application.

In one embodiment of the present application, the terminal device 1 includes, but is not limited to, a storage device 12, a processor 13, and a computer program stored in the storage device 12 and executable on the processor 13, such as a program of a device delay calibration.

Those skilled in the art can understand that the schematic diagram is only an example of the terminal device 1 and does not constitute a limitation on the terminal device 1. It may include more or fewer components than shown in the diagram, or some components may be combined or different. For example, the terminal device 1 may also include an input and output device, a network access device, a bus, etc.

The processor 13 may be a central processing unit (CPU), or other general-purpose processors, a digital signal processor (DSP), an application specific integrated circuit (ASIC), or an field-programmable gate array (FPGA) or other programmable logic devices, a discrete gate or a transistor logic device, a discrete hardware component, etc. The general-purpose processor can be a microprocessor or the processor can be any conventional processor, etc. The processor 13 is a computing core and a control center of the terminal device 1 and uses various interfaces and lines to connect various parts of the terminal device 1, and obtain an operating system of the terminal device 1 and various installed applications, program codes, etc.

The processor 13 obtains the operating system of the terminal device 1 and various installed application programs. The processor 13 obtains the application program to implement the steps in each of the above embodiments of the device delay calibration method, such as the steps shown in FIG. 2, FIG. 3 and FIG. 4.

For example, the computer program may be divided into one or more modules/units, such as an acceleration unit, and one or more modules/units are stored in the storage device 12 and retrieved by the processor 13 to complete the present application. One or more modules/units may be a series of instruction segments of the computer program capable of completing specific functions. The instruction segments are used to describe an acquisition process of the computer program in the terminal device 1.

The storage device 12 can be used to store computer programs and/or modules, and the processor 13 implements various functions of the terminal device 1 by running or acquiring the computer programs and/or modules stored in the storage device 12, and invoking the data stored in the storage device 12. The storage device 12 may mainly include a storage program area and a storage data area, wherein the storage program area may store an operating system, an application program required for at least one function (such as a sound playback function, an image playback function, etc.), etc.; the storage data area may store data based on data created by a use of the server, etc. In addition, the storage device 12 may include a non-volatile memory, such as a hard disk, a memory, a plug-in hard disk, a smart media card (SMC), a secure digital (SD) card, a flash card, at least one disk storage device, a flash memory device, or other non-volatile solid-state storage device.

The storage device 12 may be an external storage device and/or an internal storage device of the terminal device 1. Furthermore, the storage device 12 may be a storage device in a physical form, such as a memory stick, a TF card (Trans-flash Card), and so on.

If integrated modules/units of the terminal device 1 is implemented in a form of software functional units and sold or used as independent products, they can be stored in a computer-readable storage medium. Based on this understanding, the present application can implement all or part of the processes in the methods of the embodiments, and can also use a computer program to instruct relevant hardware to complete the process. The computer program can be stored in a computer-readable storage medium, and when the computer program is obtained by the processor, the steps of each of the above method embodiments can be implemented.

Among them, the computer program includes computer program codes, and the computer program codes can be in a form of source codes, object codes, an obtainable file or in some intermediate forms, etc. A computer-readable medium may include: any entity or device capable of carrying computer program codes, a recording medium, a USB flash drive, a mobile hard drive, a magnetic disk, an optical disk, a computer storage device, and a read-only memory (ROM).

Combining FIG. 2, the storage device 12 in the terminal device 1 stores a plurality of instructions to implement a device delay calibration method, and the processor 13 can obtain the plurality of instructions to implement: sending a preset instruction to at least one device in the device group, receiving a feedback signal corresponding to the preset instruction from the at least one device; calculating a round-trip delay of a signal transmission between the terminal device and the at least one device according to the preset instruction and the feedback signal; based on the round-trip delay, calculating a delay determination base corresponding to the at least one device; and performing a delay calibration on the at least one device according to the delay determination base.

Specifically, for the specific implementation method of the above instructions by the processor 13, reference can be made to the description of the relevant steps in the corresponding embodiment in FIG. 2, which will not be described again here.

In the several embodiments provided in the present application, it should be understood that the disclosed systems, devices and methods can be implemented in other ways. For example, the device embodiments described above are only illustrative. For example, the division of modules is only a logical function division, and there may be other division methods in actual implementation.

Modules described as separate components may or may not be physically separated, and components shown as modules may or may not be physical units, that is, they may be located in one place, or they may be distributed to multiple network units. Some or all of the modules can be selected according to actual needs to achieve the purpose of the solution of this embodiment.

In addition, each functional module in various embodiments of the present application can be integrated into one processing unit, or each unit can exist physically alone, or two or more units can be integrated into one unit. The above-mentioned integrated unit can be implemented in the form of hardware or in the form of hardware plus software function modules.

Therefore, the embodiments should be regarded as illustrative and non-restrictive from any point of view, and the scope of the application is defined by the appended claims rather than the above description, and therefore, it is intended that all changes that come within a meaning and a range of equivalents of the claims are embraced in the present application. Any accompanying reference signs in the claims shall not be construed as limiting the claim.

Furthermore, it is clear that the word "including" does not exclude other elements or steps, and the singular does not exclude the plural. A plurality of units or devices stated in the present application may also be implemented by one unit or device through software or hardware. The words first, second, etc. are used to indicate names and do not indicate any specific order.

Finally, it should be noted that the above embodiments are only used to illustrate the technical solutions of the present application and are not limiting. Although the present application has been described in detail with reference to the preferred embodiments, those of ordinary skill in the art should understand that the technical solutions of the present application can be modified. Modifications or equivalent substitutions may be made without departing from the spirit and scope of the technical solution of the present application.

What is claimed is:

1. A device delay calibration method applied to a terminal device, wherein the terminal device is in communication with a device group, the method comprises:
sending a preset instruction to at least one device in the device group, and receiving a feedback signal corresponding to the preset instruction from the at least one device;
calculating a round-trip delay of a signal transmission between the terminal device and the at least one device according to the preset instruction and the feedback signal;
calculating a delay determination base corresponding to the at least one device based on the round-trip delay;
performing a delay calibration on the at least one device according to the delay determination base.

2. The device delay calibration method according to claim 1, wherein the delay determination base is determined based on a time value determined by performing a probabilistic statistical method according to all round-trip delays corresponding to each device in the device group.

3. The device delay calibration method according to claim 2, wherein calculating the delay determination base comprises:

calculating the time value based on all round-trip delays corresponding to each device in the device group;

calculating the delay determination base based on the time value and the round-trip delay corresponding to each device.

4. The device delay calibration method according to claim 1, wherein calculating the delay determination base further comprises:

calculating the delay determination base according to a probability statistic.

5. The device delay calibration method according to claim 1, wherein calculating the round-trip delay of the signal transmission between the terminal device and the at least one device according to the preset instruction and the feedback signal comprises:

obtaining a first time point when the terminal device sends the preset instruction and/or a second time point when the feedback signal is received;

calculating the round-trip delay according to the first time point and/or the second time point.

6. The device delay calibration method according to claim 1, wherein performing the delay calibration on the at least one device according to the delay determination base further comprises:

determining whether the at least one device needs to be calibrated based on the round-trip delay, the delay determination base and a preset calibration threshold of the probability statistic.

7. The device delay calibration method according to claim 6, wherein determining whether the at least one device needs to be calibrated based on the round-trip delay, the delay determination base and the preset calibration threshold of the probability statistic comprises:

in response that the at least one device comprises a plurality of devices, obtaining a calculation result corresponding to each device according to the round-trip delay corresponding to each device and the delay determination base;

determining whether the device corresponding to the calculation result needs to be calibrated based on a comparison result between the calculation result and the calibration threshold of the probability statistic.

8. The device delay calibration method according to claim 1, wherein performing the delay calibration on the at least one device according to the delay determination base comprises:

in response that any device in the at least one device has a time delay determined according to the delay determination base, by shortening a signal transmission duration of the any device, achieving a signal synchronization or an action synchronization between the any device and other devices in the device group; or in response that any device in the at least one device has a time advance determined according to the delay determination base, by extending the signal transmission duration of the any device, achieving a signal synchronization or an action synchronization between the any device and other devices in the device group.

9. The device delay calibration method according to claim 1, wherein the method further comprises:

sending the preset instruction to the device that has completed a calibration, and verifying that whether the calibrated device is correctly calibrated according to the preset instruction.

10. A terminal device being communicated with a device group, comprising:

a storage device storing at least one instruction; and a processor, when the at least one instruction is executed by the processor, the processor is caused to:

send a preset instruction to at least one device in the device group, and receive a feedback signal corresponding to the preset instruction from the at least one device;

calculate a round-trip delay of a signal transmission between the terminal device and the at least one device according to the preset instruction and the feedback signal;

calculate a delay determination base corresponding to the at least one device based on the round-trip delay;

perform a delay calibration on the at least one device according to the delay determination base.

11. The terminal device according to claim 10, wherein the processor determines the delay determination base based on a time value determined by performing a probabilistic statistical method according to all round-trip delays corresponding to each device in the device group.

12. The terminal device according to claim 11, wherein the processor calculates the delay determination base by:

calculating the time value based on all round-trip delays corresponding to each device in the device group;

calculating the delay determination base based on the time value and the round-trip delay corresponding to each device.

13. The terminal device according to claim 10, wherein the processor calculates the delay determination base further by:

calculating the delay determination base according to a probability statistic.

14. The terminal device according to claim 10, wherein the processor calculates the round-trip delay of the signal transmission between the terminal device and the at least one device according to the preset instruction and the feedback signal by:

obtaining a first time point when the terminal device sends the preset instruction and/or a second time point when the feedback signal is received;

calculating the round-trip delay according to the first time point and/or the second time point.

15. The terminal device according to claim 10, wherein the processor performs the delay calibration on the at least one device according to the delay determination base further by:

determining whether the at least one device needs to be calibrated based on the round-trip delay, the delay determination base and a preset calibration threshold of the probability statistic.

16. The terminal device according to claim 15, wherein the processor determines whether the at least one device needs to be calibrated based on the round-trip delay, the delay determination base and the preset calibration threshold of the probability statistic by:

in response that the at least one device comprises a plurality of devices, obtaining a calculation result corresponding to each device according to the round-trip delay corresponding to each device and the delay determination base;

determining whether the device corresponding to the calculation result needs to be calibrated based on a comparison result between the calculation result and the calibration threshold of the probability statistic.

17. A non-transitory storage medium having at least one instruction stored thereon, when the at least one instruction is executed by a processor of a terminal device being communicated with a device group, the processor is caused to perform a device delay calibration method, wherein the method comprises:

sending a preset instruction to at least one device in the device group, and receiving a feedback signal corresponding to the preset instruction from the at least one device;

calculating a round-trip delay of a signal transmission between the terminal device and the at least one device according to the preset instruction and the feedback signal;

calculating a delay determination base corresponding to the at least one device based on the round-trip delay;

performing a delay calibration on the at least one device according to the delay determination base.

18. The non-transitory storage medium according to claim 17, wherein the delay determination base is determined based on a time value determined by performing a probabilistic statistical method according to all round-trip delays corresponding to each device in the device group.

19. The non-transitory storage medium according to claim 18, wherein calculating the delay determination base comprises:

calculating the time value based on all round-trip delays corresponding to each device in the device group;

calculating the delay determination base based on the time value and the round-trip delay corresponding to each device.

20. The non-transitory storage medium according to claim 17, wherein calculating the delay determination base further comprises:

calculating the delay determination base according to a probability statistic.

* * * * *